No. 705,571. Patented July 29, 1902.
D. FERGUSON.
LOCKING DEVICE FOR BOLTS.
(Application filed Dec. 14, 1901.)
(No Model.)
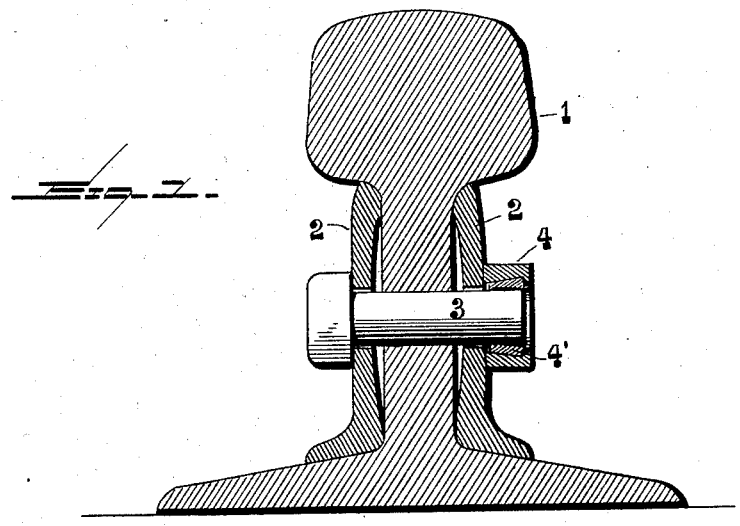
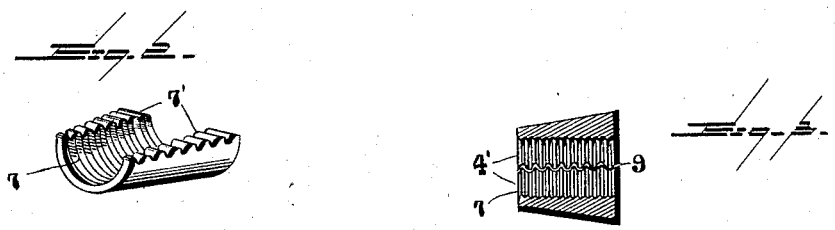
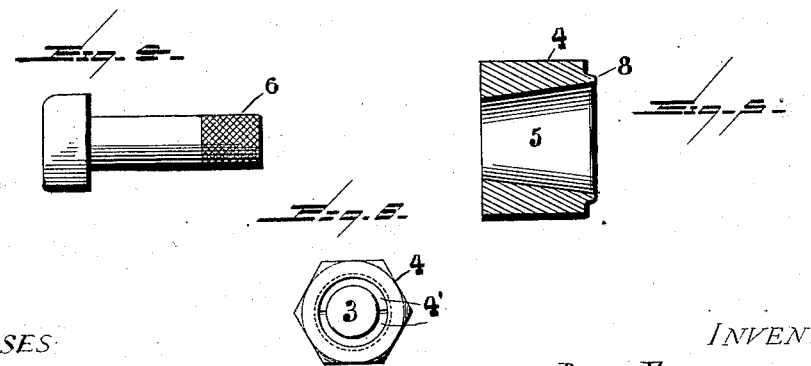
WITNESSES
INVENTOR
David Ferguson.
BY Wm L. Pierce,
his Attorney

UNITED STATES PATENT OFFICE.

DAVID FERGUSON, OF PITTSBURG, PENNSYLVANIA, ASSIGNOR OF ONE-HALF TO JENNIE F. WOOD, OF PITTSBURG, PENNSYLVANIA.

LOCKING DEVICE FOR BOLTS.

SPECIFICATION forming part of Letters Patent No. 705,571, dated July 29, 1902.

Application filed December 14, 1901. Serial No. 85,890. (No model.)

*To all whom it may concern:*

Be it known that I, DAVID FERGUSON, a citizen of the United States, residing at Pittsburg, in the county of Allegheny and State of Pennsylvania, have invented or discovered new and useful Improvements in Locking Devices for Bolts, of which the following is a specification.

In the accompanying drawings, which make part of this specification, Figure 1 is a vertical cross-section of a rail-joint, taken through a bolt-opening. Fig. 2 is a perspective of one of the locking-wedges; Fig. 3, a longitudinal section of the locking-wedges; Fig. 4, an elevation of the bolt, showing a modified form; Fig. 5, a longitudinal section of the nut, showing a modified construction; and Fig. 6, an end view of the nut, the bolt, and the locking-wedges.

The purpose of my invention is to provide a device which will securely lock a bolt and a nut together to prevent their separation in use.

My invention is particularly adapted for firmly holding in place structures subject to vibration which would loosen the ordinary nut and bolt.

I have shown my invention in connection with a rail-joint, though it is adapted for uses in any relation where it is desired to prevent with certainty the relative movement of the nut and bolt.

In the drawings the fish-plates 2 2 are applied to the rail 1 in the usual manner. The bolt 3, having a head and a smooth substantially uniform body, passes through alined apertures in the rail and fish-plates. The nut 4 is an unthreaded sleeve provided axially with a tapered bore or socket, into which are driven opposite wedges 4' 4' when the nut and bolt are stationary. To hold the wedges firmly on the bolt, the former are serrated at 7 7 transversely on the surfaces lying contiguous to the bolt and score the face of the bolt. To further prevent the retreat or withdrawal of the wedges, the edge of the nut around the bore is beaten down over their outer ends, which are driven past the outer face of the nut.

In Fig. 5 I have shown the outer face of the nut with a bead 8 raised about the edges of the bore 5, said bead to be driven down upon the ends of the wedges.

In places where the wedges cannot be gotten at to drive them in the bolt may be roughened or serrated, as shown at 6 in Fig. 4, so that when the parts are assembled the serrations on the wedges will interlock with the roughened surface of the bolt.

Preferably there should be a space between the inner ends of the wedges and the face of the fish-plate, as shown in Fig. 1, so that they may be driven in farther in case they should become loose.

The wedges have their opposing edges transversely toothed or corrugated, as at 7', the teeth or corrugations interlocking, as shown in Fig. 3, so that one wedge cannot escape as long as the other remains in place in the nut. The teeth or corrugations on one wedge should not closely fit those on the other; but a space 9 should be left, as shown in Fig. 3. This space is for the purpose of allowing a further advance of the wedges transversely of the bolt if the wedges becoming loose should be driven lengthwise again.

It will be seen that I have provided a nut and bolt lock which is constructed of but few parts, is not liable to get out of order, and is positive in its action.

While my invention is susceptible of many changes of detail within the scope thereof, the drawings illustrate merely selected forms thereof. I do not, therefore, desire to limit myself to the specific construction shown.

What I claim is—

1. In a locking device for bolts, a threadless bolt having substantially a uniform body, a threadless nut having a bore adjacent to the bolt, and a wedging device having bolt-engaging serrations and adapted to be inserted in said bore when both nut and bolt are stationary, the nut having a portion displaced to prevent the retreat of the wedging device.

2. In a locking device for bolts, a threadless bolt having substantially a uniform body, a nut having a bore adjacent to the bolt, and wedging devices having bolt-engaging serrations and interlocking teeth, the nut having a portion displaced to prevent the retreat of the said devices.

Signed at Pittsburg this 14th day of November, 1901.

DAVID FERGUSON.

Witnesses:
F. N. BARBER,
GEO. H. HARVEY.